June 14, 1960 H. K. KRANTZ 2,940,764

CENTERING FIXTURE

Filed Aug. 8, 1958 2 Sheets-Sheet 1

INVENTOR
H. K. KRANTZ
BY Edwin B. Cave
ATTORNEY

June 14, 1960 H. K. KRANTZ 2,940,764

CENTERING FIXTURE

Filed Aug. 8, 1958

2 Sheets-Sheet 2

INVENTOR
H. K. KRANTZ
BY Edwin B. Cave
ATTORNEY 2,940,764

CENTERING FIXTURE

Hubert K. Krantz, Springfield, N.J., assignor to Bell Telephone Laboratories, Incorporated, New York, N.Y., a corporation of New York Filed Aug. 8, 1958, Ser. No. 754,028

7 Claims. (Cl. 279—1)

This invention relates to centering fixtures and more particularly to a fixture for centering and orienting small components.

In the development and manufacture of solid-state devices, there is a need accurately to center and orient small thin components of various configuration, i.e., "slabs," "bars" and "wafers," for microscopic examination and/or mechanical and electrical measurements. A number of multiple jaw chucks exist for centering purposes. However, their jaw movements are not suited for both centering and orienting solid-state components in a preselected position. Further, in centering components the jaw movements of such devices do not satisfactorily compensate for dimensional variations that exist therein. Also, they are not well suited for manual and/or automated actuation, the latter being particularly desirable from a mass production manufacturing standpoint.

An object of the invention is a fixture for both orienting and centering small components.

Another object of the invention is a fixture advantageously suited for manual and/or automated actuation in orienting and centering components.

A more particular object of the invention is a fixture that accurately centers each component regardless of normal dimensional variations that exist in the components.

Another particular object of the invention is a fixture which is of simple and compact construction and which minimizes the possibility of damage to the components during the centering and orienting operation.

One feature of the invention is a plurality of jaw members, each associated with one of several keyways located in a guide plate and adapted to slide therein independently of adjacent jaw members within prescribed limits to define a working area that corresponds to the configuration of a component to be centered therein.

Another feature of the invention is a plurality of operating rings that are rotated to control the sliding movement of the jaw members.

Still another feature of the invention is means for converting the rotational movement of the operating rings to sliding movement along the keyways for application to the jaw members.

In an illustrative embodiment of the invention a jaw guide plate includes a plurality of keyways, located in a predetermined geometrical configuration with respect to a preselected centering point located on the plate. The centering point is the origin of a system of coordinates. A jaw member that includes gripping edges is assigned to each keyway. Each member is adapted to slide in its assigned keyway, the gripping edges of the jaw members enclosing the component to be centered and oriented. Means are provided to enable the jaw members to move in unison or relative to each other within prescribed limits. Means are also provided to position the jaw members in one of several positions with respect to an operator.

Other objects and features of the invention will hereinafter become more fully apparent from the following detailed description taken in conjunction with the appended drawing in which.

Figure 1:
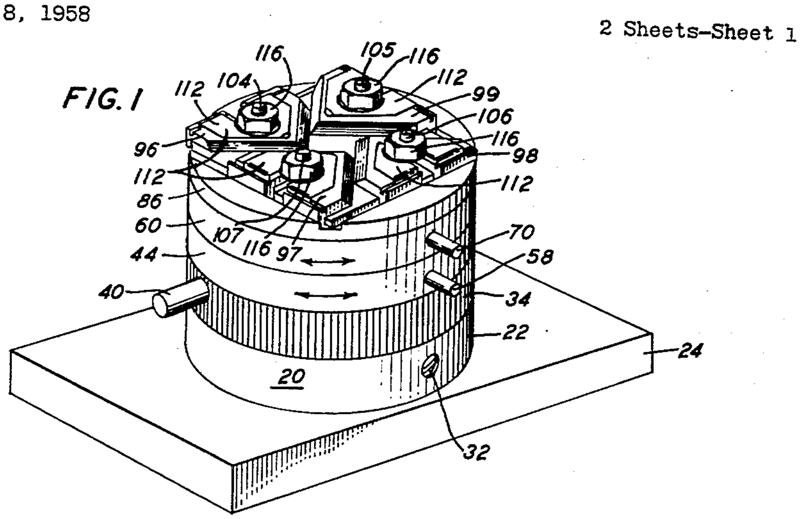
Fig. 1 is a perspective view of an illustrative embodiment of the present invention.
Figure 2:
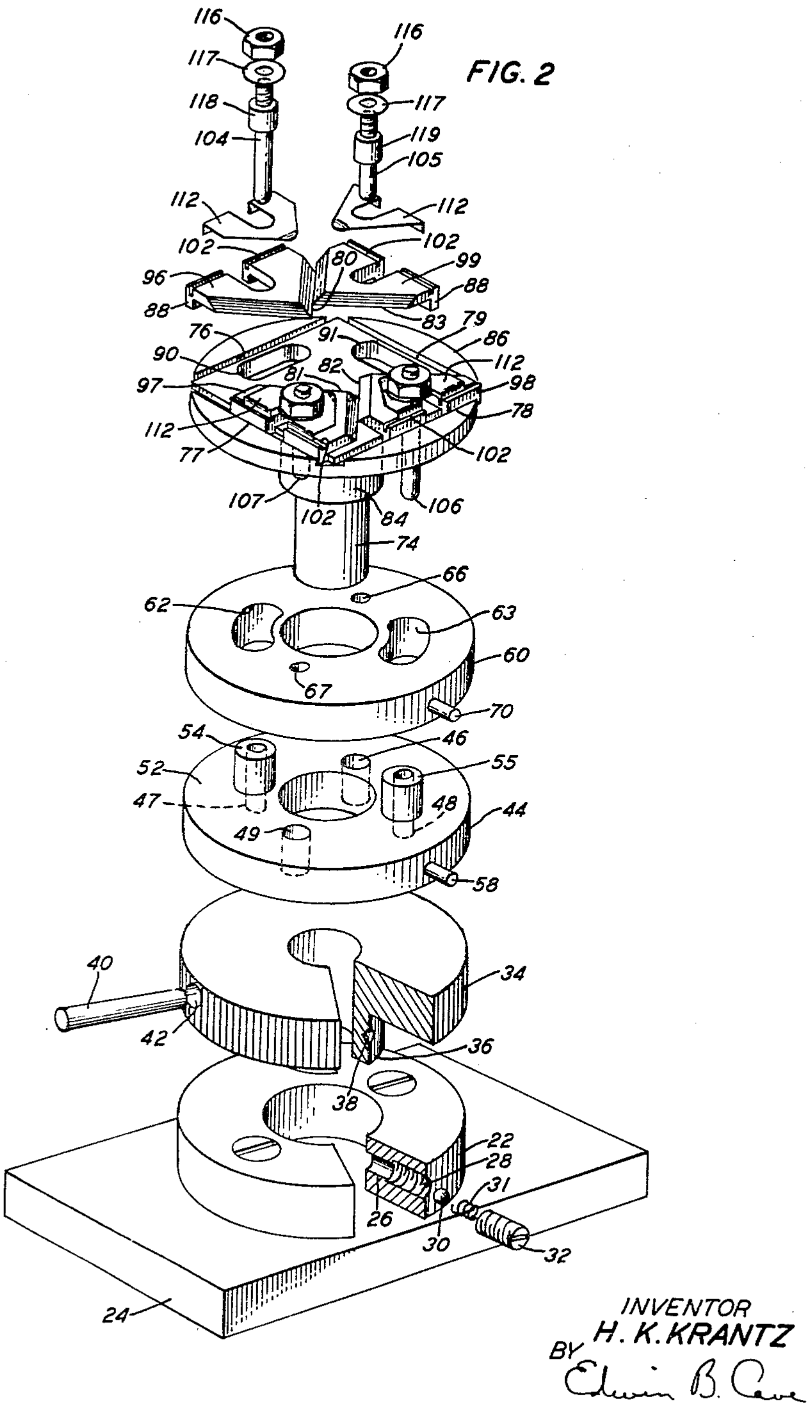
Fig. 2 is an exploded view of Fig. 1.

As shown in Figs. 1 and 2 a centering fixture 20 in accordance with the present invention adapted to orient and center rectangular components includes a base ring 22 that is secured to a plate 24 for mounting purposes only. It is understood that the fixture may be mounted by means other than that shown but the present arrangement has been selected for ease in explanation. In Fig. 2 the ring 22 is shown partially broken away to indicate a passageway 26 that is counterbored and tapped at an end 28, designated the outer end thereof. The passageway accommodates a ball bearing 30 that is biased inwardly by means of a helical spring 31 contained within the passageway by a set screw 32 that is threaded into the tapped portion of the passageway. The purpose of the biased ball bearing will become more apparent hereinafter.

A knurled ring 34 includes an axial member 36 that is journaled in the center of the base ring 22. Located within the axial member and circumferentially disposed around it are a plurality of indentations or recesses 38 (only one of which is shown). When one of the recesses is in alignment with the passageway in ring 22, the ball bearing sits in the recess and fixes the relative positions of the rings 22 and 34. The ring 34 may be rotated to seat the ball bearing in any of the other recesses. For reasons which will become more apparent hereinafter, a pin 40 is adapted to be inserted into a cavity 42 located in the knurled surface of the ring.

Seated on top of the ring 34 is a first operating ring 44 having apertures 46 through 49 located on a surface 52, designated the top surface thereof. Bushings 54 and 55 are superposed over apertures 47 and 48 and are secured to the ring 44. A pin 58 is secured to the outer edge of the ring for relative rotation thereof with respect to the knurled ring 34.

A second operating ring 60 having clearance apertures 62 and 63 and circular apertures 66 and 67 therein is seated on the ring 44. The apertures 62 and 63 accommodate the bushings 54 and 55, respectively. A pin 70 is attached to the outer edge of the ring 60 for relative movement thereof with respect to the ring 44.

A shaft 74 having an enlarged diameter section 84 is journaled in the center of the rings 44 and 60, and pressed into the center of the ring 34. A body member or guide plate 86 is attached to the shaft. The plate includes guidance means or keyways 76, 77, 78 and 79 that are arranged in a rectangular configuration. The plate also includes slots 90 through 93 (of which only 90 and 91 can be seen in Fig. 2).

Notched jaw members 96 through 99 of similar tooth configuration each include a lip portion 88 that keys into the keyways 76 through 79, respectively. The jaw members are beveled to form gripping faces or edges 80 through 83. Each jaw member includes a groove 102 that extends along the clip thereof to accommodate a clip member 112, the base of which rides in the groove.

Figure 3A:
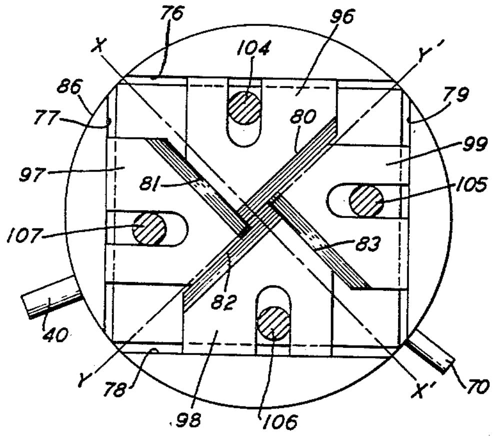
Figs. 3A and 3B are top views of Fig. 1 to show the jaw members included therein in the closed position and open position, respectively.
Figure 3B:
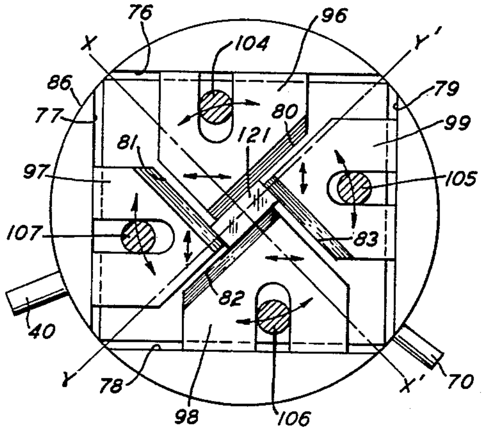

The jaw members, as will be explained hereinafter, slide along their associated keyway to form therebetween a rectangular opening for accommodating components. As shown in Figs. 3A and 3B the gripping edges 80 and 82 of jaw members 96 and 98, respectively, form the longer dimension of the rectangular working area whereas the edges 81 and 83 of jaw members 97 and 99, respectively, form the shorter dimension of the rectangular working area. It is necessary that the jaw members 96 and 98 be slightly larger than the jaw members 97 and 99 in order to produce a rectangular opening as the jaws are opened.

Extending through the notched jaw members 96 and 98 are rod members 104 and 106, respectively, which also pass through the slots 92 and 93 of the guide ring plate 86, the apertures 62 and 63 of the second operating ring 60 and terminate in the bushings 54 and 55, respectively, that are attached to the first operating ring 44. Each rod member includes a journal section 118 and is threaded on the outer end thereof. The journals set on top of the bushings 54 and 55, respectively, and as part of the rods transmit the movement of the first operating ring to the jaw members 96 and 98. The nuts 116 and the washers 117 hold the clip and jaw members against the guide plate 86 as shown in Fig. 2.

Similarly, rod members 105 and 107, which are shorter in length than the rods 104 and 106, extend through the notched jaw members 97 and 99, respectively, the slots 90 and 91 of the guide ring plate and terminate in the circular apertures of the second operating ring. These rod members each include a journal section 119 and are threaded on their outer ends. The sections 119 set on the second operating ring 60 and, as part of the rods, transmit the movement of the second operating ring to the jaw members 97 and 99. The nuts 116 and the washers 117 hold the clip and jaw members against the guide plate 86 as in the case previously described.

It is believed apparent from the foregoing that the first operating ring controls the movement of the jaw members 96 and 98 whereas the second operating ring controls the movement of the jaw members 97 and 99. The latter ring is also adapted for relative movement with respect to the first operating ring as a result of the spacing between the jaw members. This latter feature will be explained in more detail hereinafter.

To operate the jaw members, the pins 58 and 70 are driven in a clockwise direction to rotate the rings and close the jaws, or the pins are driven counterclockwise to rotate the rings and open the jaw members. As the rings are rotated in a clockwise or counterclockwise direction, the rod members are caused to move as shown in Fig. 3B. The rotary movement of the rods is accommodated by the notch in the jaw members and the width of the slots 90 through 93 (see Fig. 2). The journals of the moving rod members act against their associated jaw members to slide the latter linearly along the keyway according to the direction of rotation of the rings.

As shown in Fig. 3A, the centering point of the fixture is at the geometric center of the plate 86 and is considered to be the origin of a rectangular coordinate system with the abscissa $x—x'$ parallel to the gripping edges 81 and 83 of the jaws 97 and 99, respectively, and the ordinate $y—y'$ parallel to the gripping edges 80 and 82 of the jaws 96 and 98, respectively. As the jaw members are opened on counterclockwise rotation of the operating rings, the gripping edges move symmetrically to form a rectangular opening that corresponds to the component to be centered and oriented. The movement of the jaw members is unique in that at all times it is parallel to and normal to the corresponding axes of the coordinate system.

To center a component 121, it is placed in the rectangular opening of the fixture 20 and the operating rings rotated to close the jaws until they engage the sides of the component. As the jaws close, the component is oriented in accordance with the rectangular coordinate system of the fixture. In the event that dimensional variations exist in the component, one set of opposed jaw members will grip the components before the other set of jaw members. The spacing between adjacent jaw members and the apertures 62 and 63, however, enables the other set of jaw members to move relative to the one set and engage the component. The other set of jaw members split the dimensional variation to center the component at the geometric center of the plate 86. The spacing between adjacent jaw members is selected in accordance with the expected tolerances on the component to be oriented and centered.

The independency of the jaw pairs also provides a certain "feel" to an operator enabling the orientation and centering of a fragile component to be accomplished confidently without damage thereto from the application of excessive leverage or insensitively transmitted forces. It should also be noted that the movement of the jaw members is effected without the aid of machined spiral grooves, gearing or lead screws. This simple construction of the present invention enables precision movement of the jaw members to be achieved at a relatively low cost.

During the process of examination or measurement of a component held within the jaws, it may become desirable to orient the component to another position with respect to the operator. This orientation is readily achieved by manually rotating the knurled ring. The pin 40 may also be inserted into the cavity 42 for leverage purposes in rotating the knurled ring. The restraining or locking action of the seated ball bearing 30 on the ring 34, which has been previously described, is overcome by the rotation of the shaft. Any preselected position of the component is obtained when the ball bearing is reseated in one of the recesses 38.

It should be noted that the centering fixture is readily adaptable for mechanical actuation in repetitive centering of components during mass production manufacturing. Any number of devices, i.e., springs, pneumatic plungers, solenoids, may be employed to drive the operating rings of the fixtures. As one example of the innumerable mechanized drives that might be employed, constant force springs could be attached to the pins 58 and 70, the force of the springs being applied and/or released to actuate the operating rings.

The present invention is also suited to center and orient components of other than rectangular configuration. For example, components of square configuration may be centered by employing jaw members of notched tooth shape configuration that are identical in size. Each jaw member travels the same distance in centering components of square configuration and consequently should be of identical size.

Figure 4:
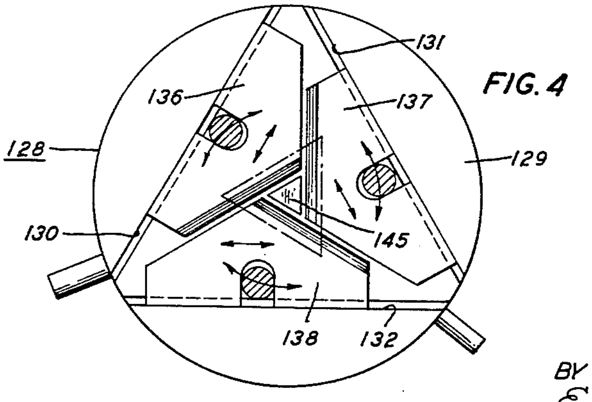
Fig. 4 is a top view of a guide plate and jaw members of another embodiment within the scope of the present invention.

In Fig. 4 is shown a top view of a fixture 128 for orienting and centering components of triangular configuration. The fixture 128, which is similar to the fixture 20, includes a guide plate 129 having keyways 130, 131 and 132. Associated with the keyways 130, 131 and 132 are notched jaw members 136, 137 and 138, respectively, which are of tooth shape configuration. The jaw members are of identical size and shape and slide along their associated keyways in response to the movement of rod members 140, 141 and 142. The jaw members are held against the guide plate by the clip members 112, nuts 116 and washers 117 (not shown) described in connection with the fixture 20.

The rod members form a triangular configuration, the center of which is in the same position as the geometric center of the guide plate. The first and second operating rings (not shown) described in connection with the fixture 20 control the rod members 140, 141 and 142, respectively.

As the operating rings are rotated clockwise, the jaw members close, the movement of each jaw member being radial with respect to the geometric center or the centering point of the fixture. Counterclockwise rotation of the operating rings opens the jaw members to form a triangularly-shaped opening for accommodating components. The spacing between adjacent jaw members enables the fixture properly to center and orient a triangularly-shaped component 145 having dimensional variations therein for the reasons mentioned in connection with the fixture 20.

It is apparent from the foregoing that the above-illustrated embodiments are only representative of the application of the principles of the present invention. Numerous other arrangements may be made by those skilled in the art without departing from the spirit and scope of the invention.

What is claimed is:

1. A centering fixture comprising a guide plate provided with a plurality of keyways on one surface thereof, a plurality of jaw members, one associated with each keyway and adapted to slide therein, a plurality of operating rings in stacked relation with said guide plate, each adapted for independent rotational movement with respect to said guide plate, and linking means between each of the jaw members and one of the operating rings for converting rotational movement of said one operating ring to sliding movement along the associated keyway of the linked jaw member.

2. A centering fixture according to claim 1 in which each of said jaw members includes a gripping edge, the jaw members are positioned so that their gripping edges define therebetween a working area which is of rectangular configuration, and the linking means are adapted to convert rotational movement of an operating ring to a movement of the gripping edge of the linked jaw member which maintains the rectangular configuration of the working area.

3. A centering fixture comprising a guide plate provided with a plurality of keyways on one surface thereof, the geometric center of the plate being the origin of a coordinate system of reference, a plurality of jaw members each having a gripping edge, one jaw member associated with each keyway and adapted to slide therein, each jaw member being disposed on the guide plate with the gripping edge thereof parallel to an assigned axis of the coordinate system, means for holding the jaw members against the guide plate, a plurality of operating rings in stacked relation with said guide plate, each adapted for independent rotational movement with respect to said guide plate, and linking means between each of the jaw members and one of the operating rings for converting rotational movement of said ring to sliding movement along the associated keyway of the linked jaw member, the movement of the gripping edge of each member being parallel to their assigned axis of the coordinate system.

4. A centering fixture comprising a guide plate provided with a plurality of keyways on one surface thereof, a plurality of jaw members, one associated with each keyway and adapted to slide therein, the jaw members being disposed on the guide plate in side by side relation, adjacent jaw members being spaced apart at predetermined distances, a plurality of operating rings in stacked relation with said guide plate, each ring provided with clearance apertures and independently rotatable with respect to said guide plate, and rod members interconnecting each of the jaw members and an operating ring whereby rotation of the operating rings in one direction causes the jaw members to slide along their assigned keyway to produce thereamong a single opening and rotation of the rings in the opposite direction causes the jaw members to close together.

5. A centering fixture comprising a guide plate provided with a plurality of keyways on one surface thereof and a shaft member, a plurality of jaw members, one associated with each keyway and adapted to slide therein, a plurality of operating rings, a knurled ring and a base ring all being in stacked relation with said guide plate, the shaft member being journaled in the operating rings and pressed into the center of the knurled ring, means for fixing the relative position of the knurled and base rings, each operating ring adapted for independent rotational movement with respect to said guide plate, and rod members interconnecting each of the jaw members and an operating ring whereby rotation of the operating rings in one direction causes the jaw members to slide along their assigned keyway to produce thereamong a single opening and rotation of the rings in the opposite direction causes the jaw members to close together.

6. A fixture for repetitive centering and orienting of a component comprising a body member having a plurality of guidance means, said guidance means being arranged in a predetermined geometrical configuration suitable to that of the component, jaw members associated with said guidance means, the gripping faces of said jaw members defining a working area of configuration substantially the same as that of the component, and means for driving the jaw members relative to the body member, the movement of adjacent jaw members being coordinated until one jaw engages the component whereupon the movement of the other jaw is independent within prescribed limits.

7. A fixture for centering and orienting a microminiature component comprising an apertured guide plate having a plurality of keyways located therein, said keyways being arranged in a predetermined geometrical configuration, a jaw member associated with each keyway and adapted to slide therein, a clip member associated with each jaw member, a rod member associated with each jaw and clip member, means for holding the jaw and clip members against the guide plate, a first operating ring for controlling one group of jaw members through their associated rod members, a second operating ring for controlling the remaining jaw and clip members through their associated rod members, a guide plate, first and second operating rings being suitably mounted in stacked relationship on a base member, and means for rotating the guide plate and the first and second operating rings relative to the base plate and latching the plate and rings in a preselected position.

References Cited in the file of this patent

FOREIGN PATENTS 1,040,277 France ---------------- May 20, 1953